United States Patent
Wang et al.

(10) Patent No.: US 6,818,713 B1
(45) Date of Patent: Nov. 16, 2004

(54) PROCESS FOR MAKING POLYETHYLENE

(75) Inventors: Shaotian Wang, Mason, OH (US); Gregory G. Hlatky, Morrow, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/638,592

(22) Filed: Aug. 11, 2003

(51) Int. Cl.$^7$ ............................ C08F 4/42; C08F 110/02
(52) U.S. Cl. ........................ 526/161; 526/352; 526/160; 526/172; 526/943; 526/129; 502/103; 502/152; 502/155
(58) Field of Search ................................ 526/352, 160, 526/161, 172, 943, 129; 502/103, 152, 155

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,539,124 A | 7/1996 | Etherton et al. | 548/402 |
| 5,637,659 A | 6/1997 | Krishnamurti et al. | 526/133 |
| 5,648,440 A | 7/1997 | Sugano et al. | 526/132 |
| 5,902,866 A | 5/1999 | Nagy et al. | 526/133 |
| 6,211,311 B1 | 4/2001 | Wang et al. | 526/131 |
| 6,232,260 B1 | 5/2001 | Nagy et al. | 502/155 |
| 6,451,724 B1 | 9/2002 | Nifant'ev et al. | 502/103 |
| 6,559,251 B1 * | 5/2003 | Wang et al. | 526/127 |

FOREIGN PATENT DOCUMENTS

| | | |
|---|---|---|
| WO | WO 01/53360 | 7/2001 |

OTHER PUBLICATIONS

Buu–Hoi and Xuong, *J. Chem. Soc.* (1952) 2225.
Diamond, et al., *J. Am. Chem. Soc. 118* (1996) 8024.
Diamond, et al., *Organometallics 15* (1996) 4045.

* cited by examiner

*Primary Examiner*—Ling-Siu Choi
(74) *Attorney, Agent, or Firm*—John Tyrell; Jonathan L. Schuchardt

(57) ABSTRACT

A process for polymerizing ethylene is disclosed. The process uses a catalyst system which has a supported open architecture indenoindolyl complex. We surprisingly found that modifying the open architecture complex to incorporate a $C_6$–$C_{20}$ hydrocarbyl amido group enables the production of polyethylene having good flow while maintaining high catalyst activity.

20 Claims, No Drawings

PROCESS FOR MAKING POLYETHYLENE

FIELD OF THE INVENTION

The invention relates to a process for making polyethylene. The process, which uses catalysts having a bridged indenoindolyl ligand with "open architecture," is valuable for making polyethylene with good flow properties.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilylzirconium dichloride and methylamido(cyclopentadienyl)-1,2-ethanediyltitanium dimethyl:

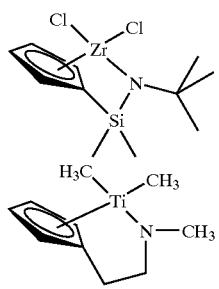

Organometallic complexes that incorporate "indenoindolyl" ligands are known (see U.S. Pat. Nos. 6,232,260 and 6,451,724). The '260 patent demonstrates the use of non-bridged bis(indenoindolyl) complexes for making HDPE in a slurry polymerization. Versatility is an advantage of the complexes; by modifying the starting materials, a wide variety of indenoindolyl complexes can be prepared. "Open architecture" complexes are neither prepared nor specifically discussed. The '724 patent ("Nifant'ev") teaches the use of bridged indenoindolyl complexes as catalysts for making polyolefins, including polypropylene, HDPE and LLDPE. The complexes disclosed by Nifant'ev do not have open architecture.

PCT Int. Appl. WO 01/53360 (Resconi et al.) discloses bridged indenoindolyl complexes having open architecture and their use to produce substantially amorphous propylene-based polymers. All of the complexes are used only to make propylene polymers; their use to produce ethylene polymers is not disclosed.

U.S. Pat. No. 6,559,251 discloses a process to make low density ethylene copolymers with catalysts having a bridged indenoindolyl ligand with open architecture. The examples use a t-butyl substituted amido ligand and the molecular weight is extremely high and ranges from 784,000 in Example 1 which includes hydrogen in the polymerization to 1,180,000 in Example 4 which uses a supported catalyst and no hydrogen. These molecular weights are so high that the copolymer would have poor flow properties and would have limited usefulness for many applications. There is no teaching as to how to control the molecular weight or of the criticality of the amido substituents.

Copending application Ser. No. 10/382,233 discloses that indeno[1,2-b]indolyl catalysts provide exceptional activities in the preparation of elastomeric polypropylene and ethylene copolymers. An open architecture complex incorporating a $C_8$ hydrocarbyl amido group is used in their Example 15 in a propylene polymerization. However, the molecular weight of the polypropylene is higher (944,000) than in their Example 12 where a complex containing a $C_4$ hydrocarbyl amido group is used to obtain polypropylene with molecular weight of 736,000. Thus, the results suggest, if anything, that using a longer alkyl chain as the amido substituent will hinder rather than enhance polyolefin flow properties.

As noted earlier, the indenoindolyl framework is versatile. The need continues, however, for new ways to make polyolefins—especially ethylene copolymers—with good flow properties. In particular, it is difficult to make ethylene copolymers having melt indices greater than about 0.5 using known processes. On the other hand, ethylene copolymers having good flow properties are valuable for several applications requiring certain melt processing techniques such as injection molding. The industry would also benefit from the availability of new processes that capitalize on the inherent flexibility of the indenoindolyl framework.

SUMMARY OF THE INVENTION

The invention is a process for making polyethylene. The process comprises polymerizing ethylene in the presence of a catalyst system comprising an activator and a supported organometallic complex. The complex, which has "open architecture," includes a Group 4 to 6 transition metal and a bridged indenoindolyl ligand. We surprisingly found that modifying the open architecture complex to incorporate a $C_6$–$C_{20}$ hydrocarbyl amido group enables the production of polyethylene having improved flow and good rheological properties while maintaining high catalyst activity.

DETAILED DESCRIPTION OF THE INVENTION

In the process of the invention, ethylene is polymerized with a catalyst system to produce polyethylene with good flow.

Catalyst systems useful for the process comprise an activator and a supported, indenoindolyl Group 4–6 transition metal complex having open architecture. More preferred complexes include a Group 4 transition metal such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only sp$^3$-hybridized carbon on the indenyl ring are "trans" to each other. Such is the case in an indeno[1,2-b] indole ring system such as:

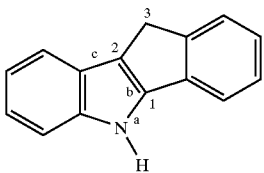

Suitable ring systems also include those in which the indole nitrogen and the sp$^3$-hybridized carbon of the indene are beta to each other, i.e., they are on the same side of the molecule. This is an indeno[2,1-b]indole ring system:

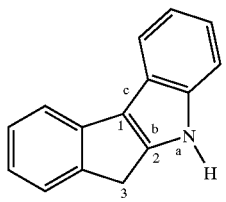

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

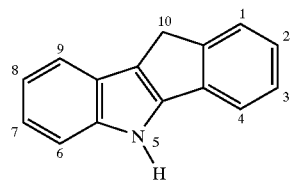

while 5,6-dihydroindeno[2,1-b]indole has the numbering:

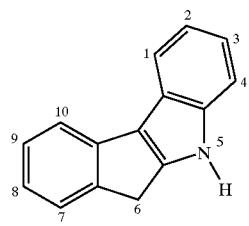

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in U.S. Pat. No. 6,451,724.)

Methods for making indenoindole compounds are well known. Suitable methods and compounds are disclosed, for example, in U.S. Pat. Nos. 6,232,260 and 6,451,724, the teachings of which are incorporated herein by reference, and references cited therein, including the method of Buu-Hoi and Xuong, *J. Chem. Soc.* (1952) 2225. Suitable procedures also appear in PCT Int. Appl. WO 01/53360.

Indenoindolyl complexes useful for the process of the invention have open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. (In contrast, many of the bridged indenoindolyl complexes described in the literature have a transition metal that is pi-bonded to the indenyl Cp ring and pi-bonded to another Cp-like group. See, e.g., U.S. Pat. Nos. 6,232,260 and 6,451,724). The metal is sigma-bonded to a $C_6$–$C_{20}$ substituted nitrogen atom. The nitrogen atom is also linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to the indolyl nitrogen or the indenyl methylene carbon.

In addition to the bridged indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

In a preferred process of the invention, the indenoindolyl complex has the general structure:

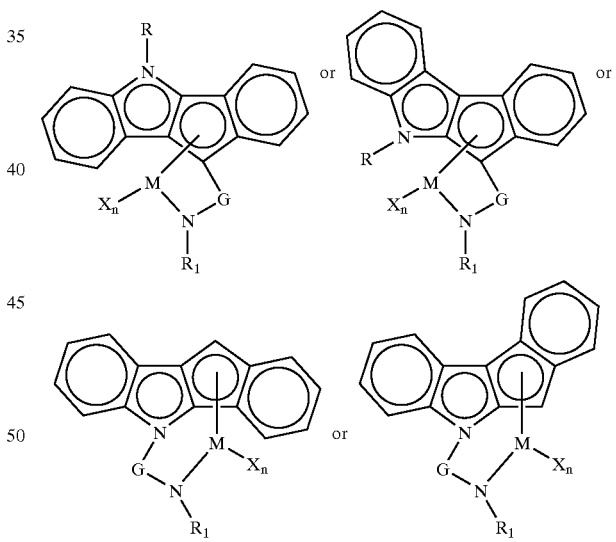

in which M is a Group 4–6 transition metal, G is a linking group, R is alkyl, aryl, dialkylboryl or trialkylsilyl, $R_1$ is $C_6$–$C_{20}$ hydrocarbyl, X is alkyl, aryl, alkoxy, aryloxy, halide, dialkylamino, or siloxy, and n satisfies the valence of M. More preferably, M is a Group 4 transition metal, G is dialkylsilyl, and X is halide or alkyl. $R_1$ is preferably $C_6$–$C_{10}$ hydrocarbyl, more preferably $C_8$ hydrocarbyl. The aromatic rings can contain one or more substituents. Suitable substituents include alkyl, aryl, halo, haloalkyl, trialkylsilyl and the like.

Exemplary organometallic complexes useful for the process of the invention:

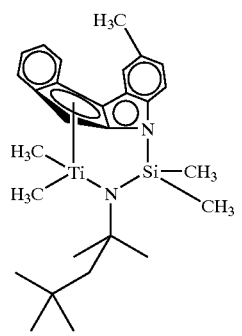

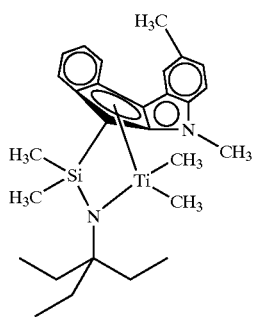

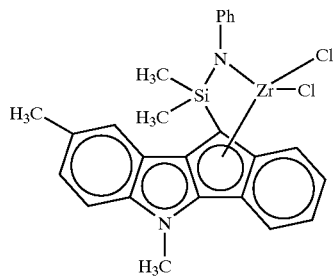

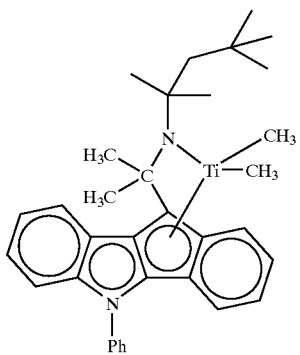

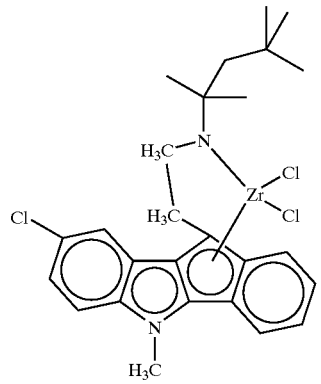

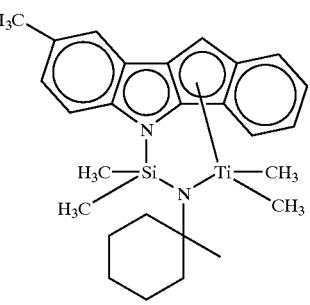

-continued

The complexes can be made by any suitable method; those skilled in the art will recognize a variety of acceptable synthetic strategies. See especially PCT Int. Appl. WO 01/53360 for suitable routes. Often, the synthesis begins with preparation of the desired indenoindole compound from particular indanone and arylhydrazine precursors. In one convenient approach, the indenoindole is deprotonated and reacted with dichlorodimethylsilane to attach a chlorodimethylsilyl group to the indenyl methylene carbon. Subsequent reaction with an amine or, more preferably, an alkali metal amide compound such as lithium 1,1,3,3-tetramethylbutylamide (from 1,1,3,3-tetramethyl butylamine and n-butyllithium), displaces chloride and gives the desired silylamine product. Double deprotonation and reaction with a transition metal source gives the target indenoindolyl metal complex having open architecture. A typical reaction sequence follows:

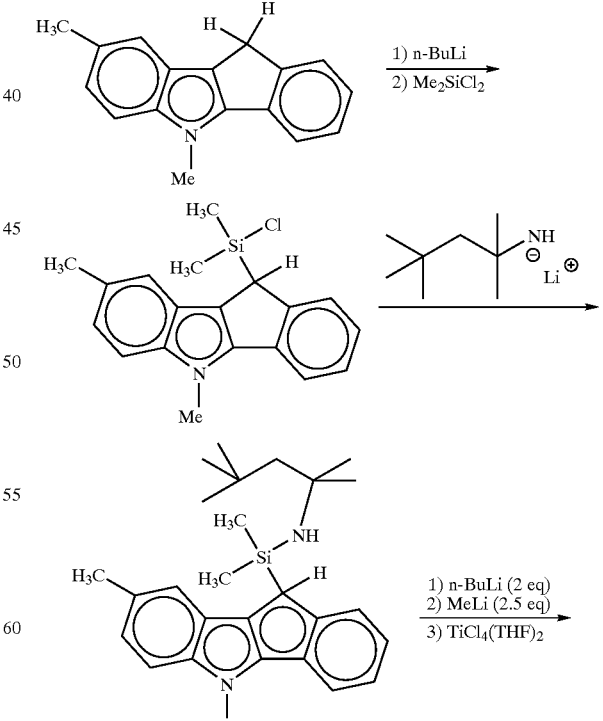

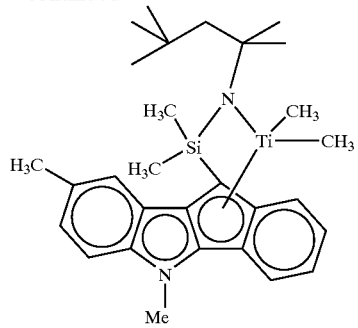

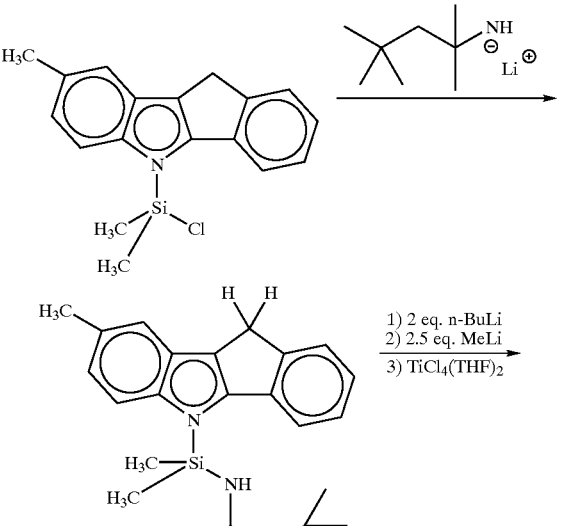

A similar complex can be generated by amine elimination, which may or may not require heating, with a method explored by Professor Richard F. Jordan and coworkers at the University of Iowa:

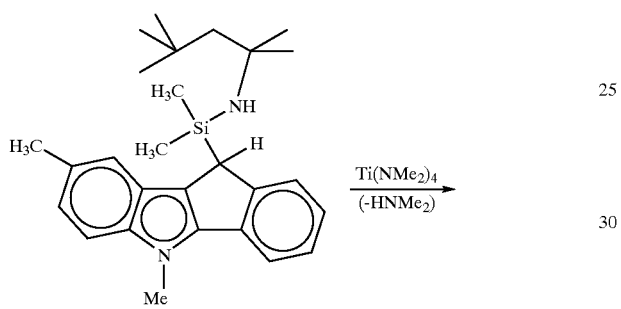

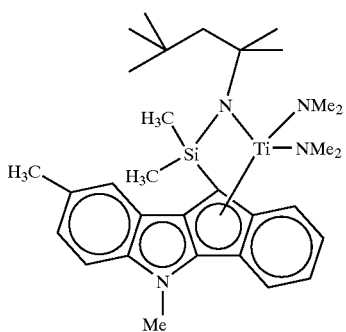

For additional examples of this approach to making organometallic complexes, see U.S. Pat. No. 5,495,035; *J. Am. Chem. Soc.* 118 (1996) 8024; and *Organometallics* 15 (1996) 4045.

The process of the invention can also utilize complexes in which bridging to the indenoindolyl group occurs through the indolyl nitrogen atom. A convenient route to an N—Si—N bridged complex is shown below:

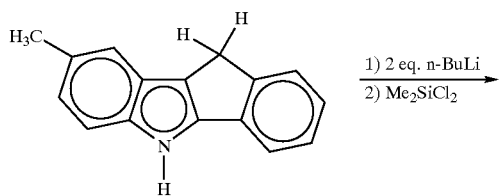

Or with amine elimination to form a similar complex:

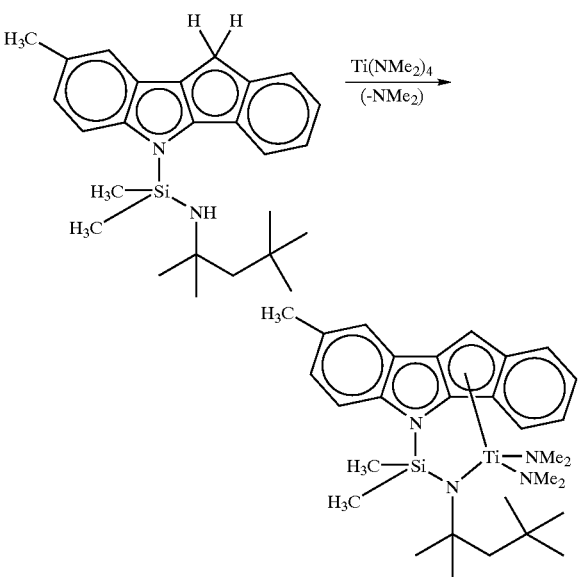

Similar strategies can be used to make a wide variety of indenoindolyl metal complexes having open architecture.

Any convenient source of the transition metal can be used to make the complex. As shown above, the transition metal source conveniently has labile ligands such as halide or dialkylamino groups that can be easily replaced by the indenoindolyl and amido anions of the bridged indenoindolyl ligand. Examples are halides (e.g., TiCl$_4$, ZrCl$_4$), alkoxides, amides, and the like.

Catalyst systems useful in the process include, in addition to the indenoindolyl metal complex, an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(pentafluoro-phenyl)borate, trityl tetrakis (pentafluorophenyl)borate and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 10 moles, of activator per mole of M. The activator can be combined with the complex and added to the reactor as a mixture, or the components can be added to the reactor separately.

The process uses a supported complex. The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

Preferably the silica has a surface area in the range of about 10 to about 1000 m$^2$/g, more preferably from about 50 to about 800 m$^2$/g and most preferably from about 200 to about 700 m$^2$/g. Preferably the pore volume of the silica is in the range of about 0.05 to about 4.0 mL/g, more preferably from about 0.08 to about 3.5 mL/g, and most preferably from about 0.5 to about 3.0 mL/g. Preferably, the average particle size of the silica is in the range of about 1 to about 500 µm, more preferably from about 2 to about 200 µm, and most preferably from about 5 to about 100 µm. The average pore diameter is typically in the range of about 5 to about 1000 angstroms, preferably about 10 to about 500 angstroms, and most preferably about 20 to about 350 angstroms. Preferably the silica is dried before use. Preferably the drying is done at a temperature of from about 100° C. to about 800° C., more preferably from about 150° C. to about 600° C.

A variety of different chemical treatments of the support can be used, including reaction with organo-aluminum, -magnesium, -silicon, or -boron compounds. See, for example, the techniques described in U.S. Pat. No. 6,211,311, the teachings of which are incorporated herein by reference.

The amount of organometallic complex added per g support material is preferably from 0.01 mmol per gram to 0.8 mmol per gram.

The activator can be added directly to the polymerization reactor before or after adding a supported organometallic complex. In other words, a supported complex—without the activator—can be prepared first. In one preferred process, a solution of the organometallic complex is combined with the support. The mixture is stirred in an inert atmosphere at a temperature of from about 0° C. to about 120° C., more preferably from about 20° C. to about 40° C. The optimum stirring time will vary somewhat, depending upon the amounts of aromatic solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the complex and the solution is added to the support. The mixture remains a free flowing solid without solvent removal. The mixture can be used as is or residual solvent may be removed.

In another preferred embodiment, a solution of the activator is added to the support prior to the addition of the organometallic complex. This solution can contain all of the activator to be used, but preferably, it contains a portion of the activator to be used. Any remaining activator can be premixed with the complex as is done in Comparative Example 3 and Example 4 or can be added to the reactor at the start of the polymerization.

Even more preferably, the organometallic complex is premixed with a solution of some or all of the activator prior to addition to the support. Preferably, the organometallic complex and activator solution are premixed for a period of time between 1 minute and two hours. When the organometallic complex is premixed with a solution of the activator, it is preferable to use a portion of the activator and to add the remainder of the activator either to the support prior to the addition of the premix or directly to the reactor.

Preferably, a scavenging amount of an alkyl aluminum compound such as triethyl aluminum or triisobutyl aluminum is also added to the reactor. Preferably, the alkyl aluminum compound is added to the reactor prior to the addition of the supported complex.

Ethylene is polymerized in the presence of hydrogen and the catalyst system. Preferably, ethylene is copolymerized with another alpha olefin. Suitable alpha-olefins are propylene, 1-butene, 1-pentene, 1-hexene, 1-octene, and mixtures thereof. 1-Hexene is particularly preferred.

Hydrogen is used in the polymerization to regulate the molecular weight. The amount of hydrogen needed depends upon the desired polyolefin molecular weight and flow. Generally, as the amount of hydrogen is increased, the polyolefin molecular weight decreases and the flow increases.

While there are many ways to practice the ethylene polymerization process of the invention, the process is preferably a slurry or gas-phase process. These processes are well-suited to the use of supported catalysts. Suitable methods for polymerizing olefins using the catalysts of the invention are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 10° C. to about 180° C.; most preferred is the range from about 30° C. to about 100° C. Olefin partial pressures normally range from about 0.1 MPa to about 350 MPa. More preferred is the range from about 0.1 MPa to about 7 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The process gives polyethylene with good flow. This has been challenging with "open architecture" indenoindolyl complexes, which favor production of high molecular weight polyolefins. As a general trend, flow decreases with increasing molecular weight. To obtain polyethylene with good flow, it is necessary to be able to control the molecular weight, which is difficult with indenoindolyl open architecture catalyst systems. A convenient way to measure flow is by measuring melt index. The melt index ($MI_2$) is measured according to ASTM D-1238, Condition E. Generally, the greater the $MI_2$, the greater the flow. By "good flow," we mean melt indices greater than about 0.5 dg/min. Preferably, the melt index is greater than about 1.0 dg/min.

Rheological testing can be done according to ASTM D4440-95A. $E_R$ is one of the elasticity parameters to be measured. Generally, a high $E_R$ indicates the presence of either long chain branching or a high molecular weight component in the resin. If the $E_R$ is too high, important properties such as impact strength and tear strength can be adversely affected. Generally, an $E_R$ of 2 is too high for many applications.

The following examples merely illustrate the invention. Those skilled in the art will recognize many variations that are within the spirit of the invention and scope of the claims.

Comparative Example 1

Open Architecture [1,2-b]Indenoindolyl Complex 4
(a) Preparation of Indeno[1,2-b]indole 1

A mixture of 1-indanone (30.6 g, 232 mmol) and p-tolylhydrazine hydrochloride (37.0 g, 233 mmol) in ethanol (350 mL) and aqueous HCl (12 N, 18 mL) is heated to reflux for 90 minutes. The mixture is cooled and filtered, and the solid is washed with ethanol (600 mL) followed by 20% aqueous ethanol (400 mL) and finally hexanes (200 mL). The off-white solid is dried under vacuum (36.5 g, 72%).
(b) N-Methylation of 1

A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of methyl iodide (17.0 mL, 273 mmol) in toluene (15 mL) is added dropwise, and the mixture is stirred at room temperature for 4 hours and refluxed for 3 hours. A crystalline solid forms upon cooling and is filtered and washed with cold (−78° C.) ethanol (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).
(c) Bridged Ligand Preparation (3)

n-Butyllithium (8 mL, 2.5 M in hexane, 20 mmol) is added dropwise to a solution of 2 (4.66 g, 21 mmol) in dry ether (70 mL). After 2 hours, this solution is slowly added to a solution of dichlorodimethylsilane (5.20 g) in ether (30 mL). After 2 hours of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 hours, and is then filtered through Celite filter aid. After concentrating the filtrate, the residue is collected with pentane and chilled to −30° C. Yield of bridged ligand 3:6 g (82%).
(d) Open architecture [1,2-b]Indenoindolyl Complex 4

Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 hours. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g. The $^1H$ NMR spectrum is consistent with the proposed structure.

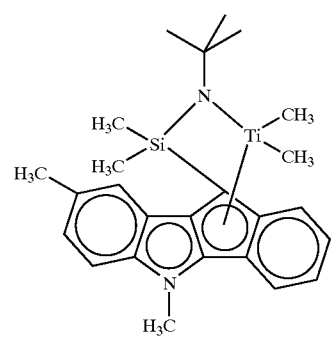

Example 2

Open Architecture [1,2-b]Indenoindolyl Complex 5

The synthesis of Example 1 is generally followed except that lithium 1,1,3,3-tetramethylbutylamide is used in place of lithium t-butylamide to yield open architecture [1,2-b] indenoindolyl complex 5.

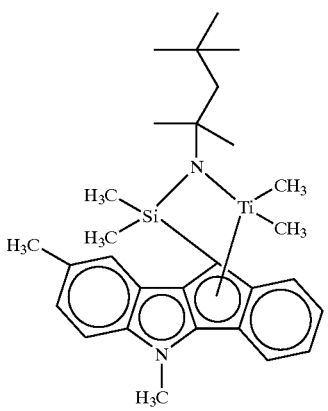

Comparative Example 3

Preparation of Supported Complex 4

Grace Davison 955 silica is calcined at 250° C. for 12 hours. In a glove-box under nitrogen, a 30 wt. % solution of methylalumoxane (MAO) in toluene (0.8 mL) is slowly added to a sample (1.0 g) of the calcined silica at room temperature with efficient stirring. After the MAO addition is complete, stirring continues for 0.5 hours. Volatiles are removed under vacuum (about 28.5 inches Hg, 1 hour) at room temperature. Yield: 1.30 g of MAO-treated silica.

Also in the glovebox, 30 wt. % MAO/toluene solution (1.18 mL) is diluted with toluene (3.4 mL), and an amount of open architecture titanium complex 4 (21.2 mg, equal to 0.048 mmol of titanium) is then added to the diluted MAO to form a solution. This resulting solution is then mixed with the dry, MAO-treated silica described above. After stirring for an additional 0.5 hour, the supported complex is dried under vacuum to give a supported complex (about 1.80 g).

Example 4

Preparation of Supported Complex 5

The procedure of Example 3 is generally followed except that complex 5 (23.0 mg, equal to 0.048 mmol of titanium) is used in place of complex 4.

Example 5

Copolymerization of Ethylene with 1-Hexene by Supported Complex 5

A one-liter, stainless-steel reactor is charged with hydrogen (2.1 MPa pressure drop from a 10 mL hydrogen cylinder on line) and 1-hexene (15 mL). Triisobutylaluminum (0.50 mL of 1.0 M solution in heptane, 0.50 mmol) and Stadis 425 fatty amine, a product of Akzo Nobel (12 mg in 3 mL of heptane), which are preloaded in one sidearm of the injector are flushed into the reactor with isobutane (400 mL) and nitrogen pressure. The reactor is then pressurized with ethylene to 2.4 MPa. The reactor contents are allowed to equilibrate at 80° C. The supported catalyst (60 mg of silica-supported complex 5 from Example 4) is loaded into the other injector arm and then flushed into the reactor with isobutane (85 mL) and nitrogen pressure. The polymerization proceeds for 0.5 hour. The reactor is vented and the polymer (65.1 g) is collected after vacuum drying at 60° C.

Comparative Example 6

Copolymerization of Ethylene with 1-Hexene by Supported Complex 4

The polymerization procedure described in Example 5 is generally followed except that silica-supported complex 4 from Comparative Example 3 is used. The polymer (59.3 g) is collected after vacuum drying at 60° C.

Comparative Example 7

Copolymerization of Ethylene with 1-Hexene by Supported Complex 4

The polymerization procedure of Comparative Example 6 is generally followed except that more hydrogen is used (2.8 MPa pressure drop from a 10 mL hydrogen cylinder on line). The polymer (42.4 g) is collected after vacuum drying at 60° C.

The results of the polymerizations are summarized in Table 1.

TABLE 1

| | | | Polymerization Results | | | | |
| Example | $R_1$ | Complex | Activity [kg/g · Ti · h] | $MI_2$ | Mw | Mw/Mn | $E_R$ |
| --- | --- | --- | --- | --- | --- | --- | --- |
| 5 | t-octyl | 5 | 1,740 | 1.2 | 98,000 | 4.1 | 0.65 |
| C6 | t-butyl | 4 | 1,650 | 0.3 | 148,000 | 3.9 | 2.9 |
| C7 | t-butyl | 4 | 1,140 | 1.1 | 110,000 | 3.8 | 1.0 |

Example 5 gives a copolymer with high catalyst activity, good flow properties, and low $E_R$. Comparative Example 6, done under the same conditions, has much poorer flow. The $MI_2$ is much lower and the polyolefin has larger molecular weight and much higher $E_R$.

Comparative Example 7 lowers the molecular weight by increasing the amount of hydrogen used in the polymerization. This improves the flow (increases Ml) and lowers the $E_R$, but there is a large (34%) drop in catalyst activity.

Thus, the complex having a longer chain hydrocarbyl amido group, here a $C_8$ hydrocarbyl, provides an unexpected benefit in flow and rheological properties versus the shorter chain hydrocarbyl amido group complex.

The preceding examples are meant only as illustrations. The following claims define the invention.

We claim:

1. A process which comprises polymerizing ethylene in the presence of hydrogen and a catalyst system which comprises an activator and a supported complex to produce polyethylene having a melt index greater than about 0.5 wherein the complex has the general structure selected from the group consisting of:

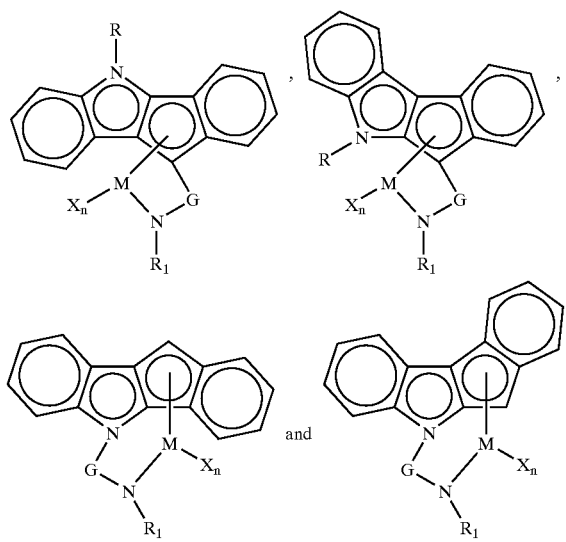

in which M is a Group 4–6 transition metal, G is a linking group, R is alkyl, aryl, dialkylboryl, or trialkylsilyl, $R_1$ is $C_6$–$C_{20}$ hydrocarbyl, X is alkyl, aryl, alkoxy, aryloxy, halide, dialkylamino, or siloxy, and n satisfies the valence of M.

2. The process of claim 1 which further comprises copolymerization with at least one alpha-olefin.

3. The process of claim 2 wherein the alpha-olefin is selected from the group consisting of propylene, 1-butene, 1-pentene, 1-hexene, 1-octene and mixtures thereof.

4. The process of claim 1 wherein the activator is selected from the group consisting of alumoxanes, ionic borates, ionic aluminates, alkylaluminums, and aluminoboronates.

5. The process of claim 1 wherein M is a Group 4 transition metal.

6. The process of claim 1 wherein $R_1$ is $C_6$–$C_{10}$ hydrocarbyl.

7. The process of claim 1 wherein $R_1$ is $C_8$ hydrocarbyl.

8. The process of claim 1 wherein M is Ti or Zr, G is dimethylsilyl, and X is halide or alkyl.

9. The process of claim 1 wherein the polyethylene has a melt index greater than about 1.0.

10. The process of claim 1 wherein the support is selected from the group consisting of silicas, aluminas and silica-aluminas.

11. The process of claim 1 wherein the polymerization is performed at a temperature within the range of about 30° C. to about 100° C.

12. A slurry polymerization process of claim 1.

13. A gas-phase polymerization process of claim 1.

14. The process of claim 1 wherein the support is chemically pretreated.

15. The process of claim 1 wherein the complex and some or all of the activator are premixed and then combined with the support.

16. The process of claim 14 wherein the complex and some or all of the activator are premixed and then combined with the chemically pretreated support.

17. The process of claim 1 wherein the activity is greater than about 1300 kg polyethylene per g transition metal per hour.

18. A process which comprises copolymerizing ethylene with an alpha-olefin in the presence of hydrogen and a catalyst system which comprises an activator and a supported complex to produce polyethylene having a melt index greater than about 0.5 wherein the complex has the general structure:

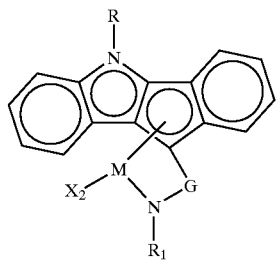

in which M is a Group 4 transition metal, R is methyl or phenyl, $R_1$ is $C_6$–$C_{10}$ hydrocarbyl, G is a linking group and X is alkyl, aryl, alkoxy, aryloxy, halide, dialkylamino, or siloxy.

19. The process of claim 18 wherein G is dimethylsilyl and M is Ti.

20. The process of claim 18 wherein the complex has the general structure:

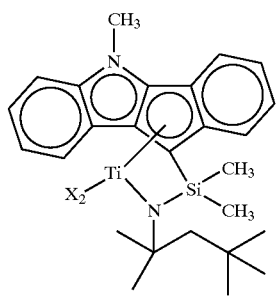

in which X is alkyl, aryl, alkoxy, aryloxy, halide, dialkylamino, or siloxy.

* * * * *